United States Patent
Murugesan et al.

(10) Patent No.: US 11,411,800 B1
(45) Date of Patent: Aug. 9, 2022

(54) HIGH RESILIENCY CONTENT DELIVERY NETWORK BACKUP MECHANISM FOR MICRO FRONTEND WEB APPLICATIONS

(71) Applicant: INTUIT INC., Mountain View, CA (US)

(72) Inventors: Venkatesan Murugesan, Mountain View, CA (US); Karim Lakhani, San Diego, CA (US); Samy Mohamed Ismail Mohamed, San Diego, CA (US); Sarika N. Kale, Mountain View, CA (US); Alexey Povkh, Mountain View, CA (US); Hung T. Nguyen, San Diego, CA (US); Laurent Benchimol, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/387,793

(22) Filed: Jul. 28, 2021

(51) Int. Cl.
| | |
|---|---|
| *H04L 41/0604* | (2022.01) |
| *H04L 12/28* | (2006.01) |
| *H04L 67/02* | (2022.01) |
| *H04L 41/0654* | (2022.01) |
| *G06F 9/455* | (2018.01) |

(52) U.S. Cl.
CPC ...... *H04L 41/0627* (2013.01); *G06F 9/45512* (2013.01); *H04L 12/2834* (2013.01); *H04L 41/0672* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 10,162,624 B1 * | 12/2018 | Moturu | | G06F 9/44521 |
| 11,138,518 B1 * | 10/2021 | Yu | | G06F 9/44526 |
| 11,157,259 B1 * | 10/2021 | Lin | | G06F 8/38 |
| 2007/0192502 A1 * | 8/2007 | McCollum | | G06F 9/45512 |
| | | | | 709/227 |
| 2014/0075322 A1 * | 3/2014 | Delano | | H04L 41/0253 |
| | | | | 715/736 |
| 2018/0302281 A1 * | 10/2018 | Khan | | H04L 41/0806 |
| 2021/0165668 A1 * | 6/2021 | Verma | | G06F 9/44526 |
| 2021/0377332 A1 * | 12/2021 | Ray | | H04L 67/327 |
| 2021/0405826 A1 * | 12/2021 | Shields | | G06F 8/38 |
| 2022/0131218 A1 * | 4/2022 | Chen | | H01M 10/482 |

\* cited by examiner

*Primary Examiner* — Lashonda Jacobs-Burton
(74) *Attorney, Agent, or Firm* — DLA Piper LLP (US)

(57) ABSTRACT

A computing system receives, from a client device, a first request for access to a single page application associated with the computing system. A gateway of the computing system intercepts the first request before it reaches a shell service associated with the single page application. The gateway sends a second request for the single page application to the shell service. Based on the single page application request, the gateway determines that the shell service is experiencing a failure. Responsive to determining that the shell service is experiencing a failure, the gateway retrieves, from a content delivery network, a uniform resource locator (URL) associated with a time-lapse hypertext markup language (HTML) of the single page application. The gateway redirects the client device to the time-lapse HTML of the single page application using the URL.

20 Claims, 5 Drawing Sheets

HIGH RESILIENCY CONTENT DELIVERY NETWORK BACKUP MECHANISM FOR MICRO FRONTEND WEB APPLICATIONS

BACKGROUND

Micro frontend single page applications typically rely on dynamic composition of the entire application navigation and render them on the browser side. Typically, a service may facilitate such dynamic composition based on the incoming request, user context, and other services the service may depend on (e.g., plugin metadata, application metadata, other context, and the like). If any of these services fail, however, the application cannot be generated at all. Instead, users will typically see a 50x static error page, which is undesirable.

DETAILED DESCRIPTION OF SEVERAL EMBODIMENTS

The disclosed system and method include one or more techniques for managing access to a single page application. A computing system receives, from a client device, a first request for access to a single page application associated with the computing system. A gateway of the computing system intercepts the first request before it reaches a shell service associated with the single page application. The gateway sends a second request for the single page application to the shell service. The gateway may determine that the shell service is experiencing a failure. If there is failure, the gateway retrieves, from a content delivery network, a uniform resource locator (URL) associated with a time-lapse hypertext markup language (HTML) of the single page application. The gateway redirects the client device to the time-lapse HTML of the single page application using the URL.

The present approach provides an improvement over conventional single page application systems. For example, in conventional systems, when a user requests a single page application, the users may receive an error if any of the plugins or widgets (more generally, "services") are unavailable. In other words, if any component of the single page application is down, the entire request will fail. To account for this, the disclosed system includes a gateway that manages or intercepts requests for a single page application to a single page application server hosting the single page application. If the gateway determines that any service incorporated into the single page application is down or non-responsive, rather than providing the user with a server error, the gateway may provide the user with a time-lapse HTML of the single page application. The time-lapse HTML may be thought of as a "skeleton" version of the single page application that includes all necessary scripts for loading the application at runtime, creating the application layout, and bootstrapping all widgets needed for navigation through the single page application. In this manner, the disclosed system may provide users with a fully-functional single page application even when a service associated with the shell service is down.

Figure 1:
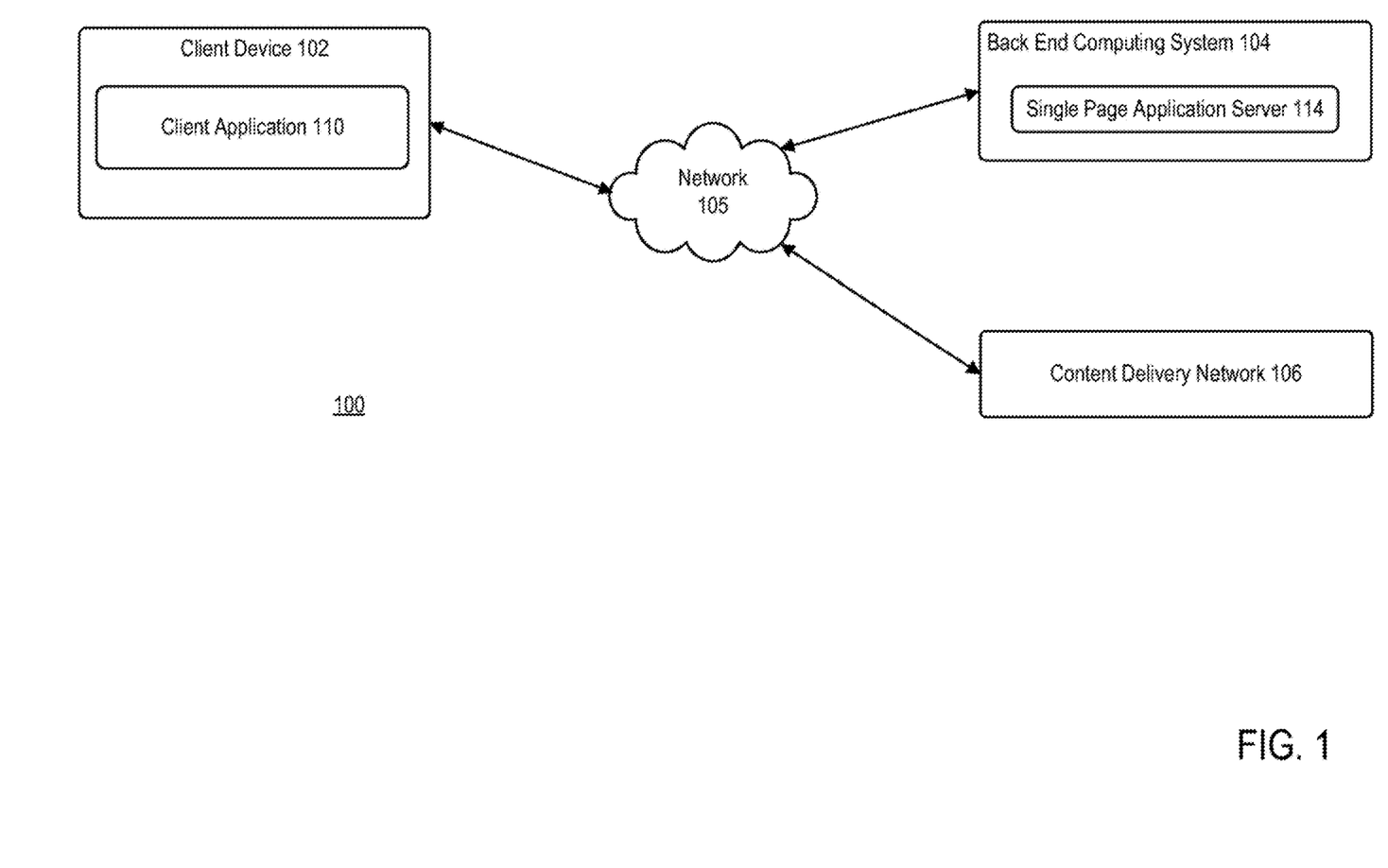
FIG. 1 shows an example computing environment, according to various embodiments of the present disclosure.

FIG. 1 shows an example computing environment 100, according to embodiments of the present disclosure. Computing environment 100 may include one or more client devices 102 and a back-end computing system 104. Client devices 102 and back-end computing system 104 may be configured to communicate through network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 105 may be the Internet, a private data network, virtual private network using a public network and/or other suitable connection(s) that enables components in computing environment 100 to send and receive information between the components of computing environment 100.

In some embodiments, communication between the elements may be facilitated by one or more application programming interfaces (APIs). APIs of back-end computing system 104 may be proprietary and/or may be examples available to those of ordinary skill in the art such as Amazon® Web Services (AWS) APIs or the like.

Client device 102 may be operated by a user. Client device 102 may be representative of a mobile device, a tablet, a desktop computer, or any computing system having the capabilities described herein. Client device 102 may include at least client application 110. Application 110 may be representative a web browser or a stand-alone application associated with back-end computing system 104. A user of client device 102 will utilize application 110 to access functionality associated with back-end computing system 104. In some embodiments, client device 102 may communicate over network 105 to request a web page, for example, from single page application server 114. In some embodiments, client device 102 may utilize application 110 to access a single page application hosted by back-end computing system 104. In some embodiments, a single page application may refer to a web application or website that interacts with the user by dynamically rewriting the current web page with new data from the web server rather than loading new pages of information. In other words, a web browser does not need to reload the web application or website during use.

Back-end computing system 104 is configured to communicate with one or more client devices 102. As shown, back-end computing system 104 includes a single page application server 114. Single page application server 114 may be comprised of one or more software modules. The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather as a result of the instructions.

In one or more embodiments, single page application server 114 is configured to manage the serving of a single page application, associated with back-end computing system 104. For example, based on a hypertext transfer protocol (HTTP) request initiated by client device 102, single page application server 114 may provide client device 102 with an associated single page application.

Content delivery network 106 may be representative of a content delivery network associated with back-end computing system 104. In some embodiments, content delivery network 106 may be internal to back-end computing system 104. In some embodiments, content delivery network 106 may be external to back-end computing system 104. In some embodiments, content delivery network 106 may be representative of a computing environment configured to store time-lapse copies of each single page application managed by single page application server 114. In this manner, when there may be an error with the single page application, single page application server 114 may provide a user with a time-lapse copy of the single page application instead of an error message.

Figure 2:
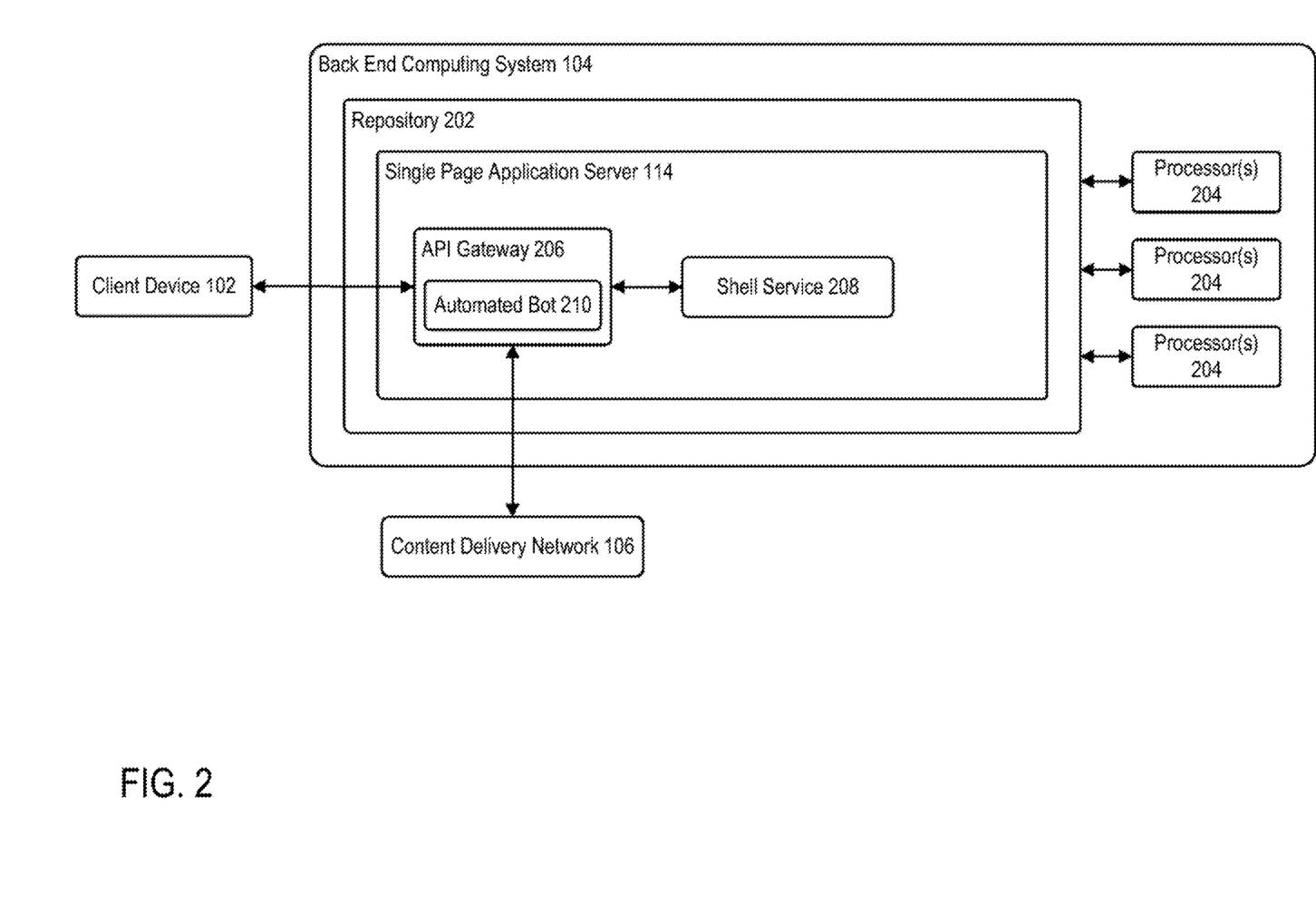
FIG. 2 is a block diagram illustrating a back-end computing system, according various embodiments of the present disclosure.

FIG. 2 is a block diagram illustrating back-end computing system 104, according to one or more embodiments disclosed herein. As shown in the illustrated example, back-end computing system 104 includes a repository 202 and one or more computer processors 204. In some embodiments, back-end computing system 104 may take the form of the computing device 500 described in FIG. 5 and the accompanying description below. In one or more embodiments, one or more computer processors 204 may take the form of computer processor(s) 502 described in FIG. 5 and the accompanying description below.

In some embodiments, repository 202 may be any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes single page application server 114.

Single page application server 114 is configured to process HTTP requests, from a client device, for access to one or more single page applications managed by single page application server 114. While single page application server 114 may be configured to manage multiple single page applications, those skilled in the art recognize that there may be a separate single page application server 114 for each single page application associated with back-end computing system 104.

As shown, single page application server 114 includes an application programming interface (API) gateway 206 and a shell service 208. Each of API gateway 206 and shell service 208 may be comprised of one or more software modules.

The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather as a result of the instructions.

API gateway 206 is configured to intercept requests to shell service 208 for a single page application. For example, upon receiving an HTTP request from client device 102, via application 110 executing thereon, API gateway 206 may intercept or receive the request before it reaches shell service 208. An example request may be, for example, https://my.turbotax.com. In some embodiments, the request may include user context information. Exemplary user context information may include an authentication token. The authentication token may be used to retrieve user specific information, like AB test assignments, authorization ID, and the like. In some embodiments, user context information may further include a desired first experience to be rendered, as specified in the uniform resource locator (URL) path. For example, /index/2020/tto may correspond to a request to show tax year 2020's tax prep experience. In another example, /index/2019/mytt may correspond to a request for tax year 2019's my.turbotax.com homepage. Upon receiving the request, API gateway 206 forwards the request to shell service 208 for dynamic composition of the single page application based on the incoming request and the user context.

In one or more embodiments, shell service 208 (e.g., AppFabric Shell Service) is configured to process a request from API gateway 206 and provide API gateway 206 with hypertext markup language (HTML) of the requested single page application. Shell service 208 may allow for dynamic generation of customized user interfaces and user experiences for single page applications executing on top of the shell. As shown, shell service 208 may be hosted by single page application server 114 for a specific software product and may be deployed such that applications and widgets (e.g., services) built on shell service 208 are continually integrated and updated. Shell service 208 may allow for the creation of dynamic user interfaces and user experiences customized for a particular user by combining native and non-native user interface components from a variety of relevant plugins. In some embodiments, the plugins selected by shell service 208 may be selected based on the context in which a user is executing the single page application. For example, shell service 208 may provide shared components to be used by widgets loaded into shell service 208 to communicate between widgets and to access other functionality common to shell service 208, such as, but no limited to, data logging, testing, authentication, and so on.

In conventional systems, client device 102 may interface directly with shell service 208. For example, instead of API gateway 206 intercepting an HTTP request from client device 102 for access to a single page application, the HTTP request is typically transmitted directly to shell service 208. In some situations, shell service 208 may experience a failure. For example, shell service 208 or any other services upon which shell service 208 may depend may experience a failure, resulting in shell service 208 being unable to generate the single page application. As a result, client device 102 may be provided with a 50× static error page until the failure has been resolved.

To account for this limitation of conventional systems, API gateway 206 includes an automated bot 210. Automated bot 210 is configured to periodically call shell service 208 for the single page application managed by shell service 208. For example, automated bot 210 may generate an HTTP request associated with the single page application. Continuing with the above example, automated bot 210 may generate the HTTP request: https://my.turbotax.com. In some embodiments, the request from automated bot 210 to shell service 208 may be a cURL call with special query parameters built-in. Automated bot 210 may receive, from shell service 208, the HTML corresponding to the single page application associated with the HTTP request. Automated bot 210 captures a time-lapse HTML of the single page application and stores the time-lapse HTML of the single page application in content delivery network 106. In some embodiments, the time-lapse HTML of the single page application may be agnostic of user context. In other words, the time-lapse HTML of the single page application may be representative of a skeleton version of the single page application. In some embodiments, the time-lapse HTML may include all necessary scripts for loading the application at runtime, creating the application layout, and bootstrapping all widgets needed for navigation through the single page application.

In some embodiments, API gateway 206 is configured to continuously monitor shell service 208 and detect for any signs of failure from shell service 208 by checking for 50× and/or 429 errors. In some embodiments, API gateway 206 is configured to detect for any signs of failure from shell service 208 by setting a threshold time limit for shell service 208 to respond. For example, API gateway 206 may set a throttling threshold of X-seconds. If shell service 208 does not respond within X-seconds, then API gateway 206 may determine that a failure is present.

If API gateway 206 determines that a failure is present, API gateway 206 redirects client traffic to the matching single page application URL, as stored in content delivery network 106, where the time-lapse HTML of the single page application is stored. The time-lapse HTML of the single page application may be structured in a way that a skeleton version of the single page application can start without any user context. A skeleton version of the single page application may be thought of as a template for generating the single page application. For example, the skeleton version of the single page application may include a default layout and/or default web elements that may be common across a plurality of users accessing the single page application. All user specific context may be fetched from the side of client device 102 and integrated with the skeleton version of the single page application to generate the single page application for the user. In some embodiments, the time-lapse HTML may include user agnostic information, such that client device 102 may load dynamic user context information onto the user side when client device 102 initializes the time-lapse HTML. In this manner, the single page application may be fully functional for the end user to navigate, even when shell service 208 is down.

API gateway 206 may be configured to restore the single page application back to a "live mode," once API gateway 206 determines that shell service 208 is functional again and can serve live traffic. In this manner, single page application server 114 may allow users to use a time-lapse HTML of a single page application, when requested, with full functionality, including user context, for pre-authentication functionality and post-authentication functionality.

Figure 3:
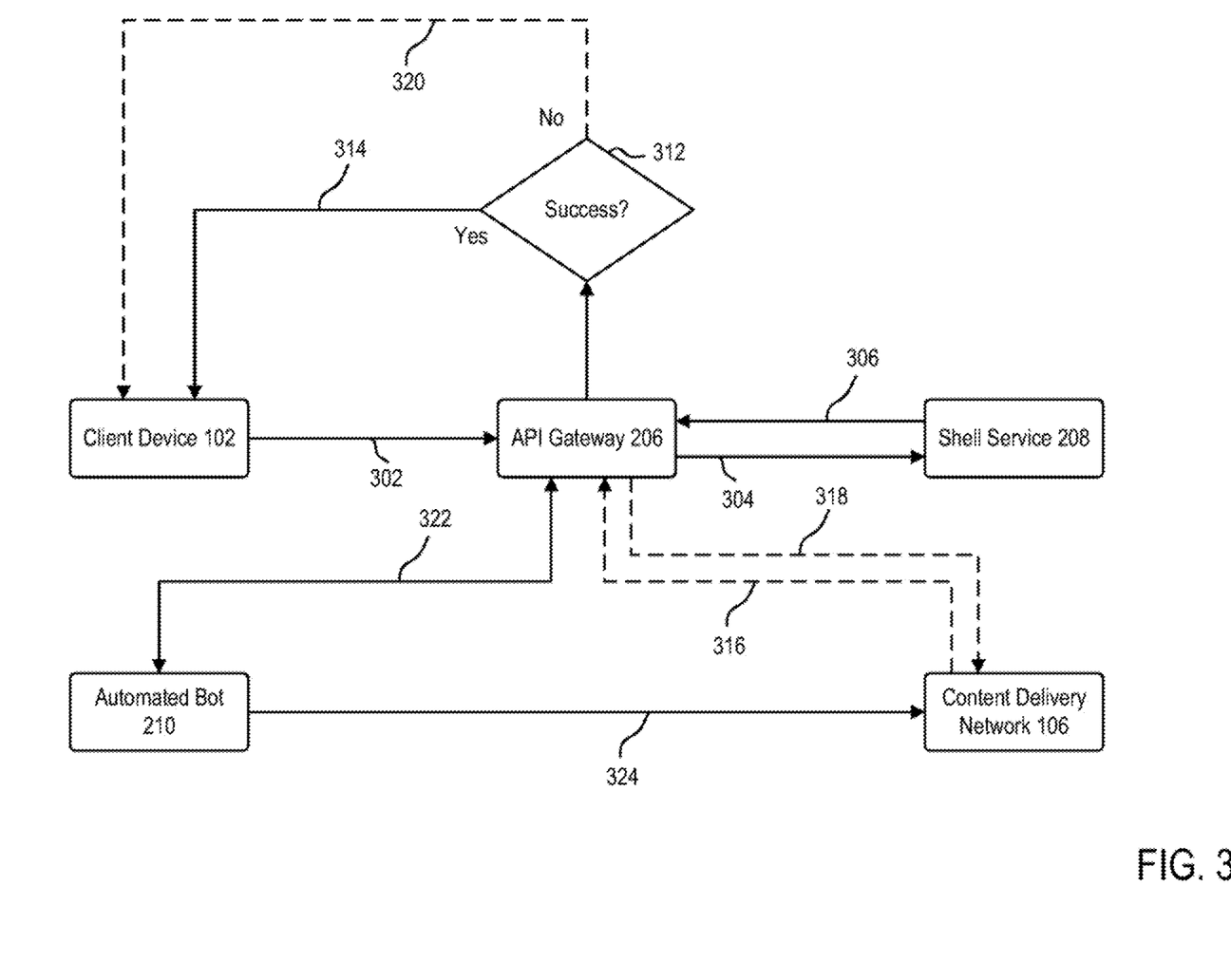
FIG. 3 is a block diagram illustrating communications among components of the computing environment of FIG. 1, according to various embodiments of the present disclosure.

FIG. 3 is a block diagram illustrating communication among components of computing environment 100, according to example embodiments.

As shown, client device 102 transmits an HTTP request (302) to API gateway 206. The HTTP request (302) may be transmitted from application 110 executing on client device 102 to single page application server 114 and intercepted by API gateway 206. In some embodiments, the HTTP request may include user context information.

API gateway 206 receives or intercepts the HTTP request from client device 102. API gateway 206 submits a GET request (304) to shell service 208 for a corresponding single page application. In some embodiments, shell service 208 may provide API gateway 206 with an HTML for the single page application (306). In some embodiments, shell service 208 may not respond to the GET request within the threshold amount of time, as specified by API gateway 206.

At block 312, API gateway 206 analyzes the HTML for any signs of failure from shell service 208 by checking for 50× and/or 429 errors. If API gateway 206 determines that no failures are present (yes at block 312), then API gateway 206 may provide client device 102 with the HTML for the single page application (314).

If, however, API gateway 206 determines that there is a failure present (no at block 312), then API gateway 206 transmits a GET request (316) to content delivery network 106 for a time-lapse HTML of the single page application. Content delivery network 106 then provides API gateway 206 with the time-lapse HTML (318). API gateway 206 then provides client device 102 with a URL associated with the time-lapse HTML so that application 110 may be redirected to content delivery network 106 for access to the time-lapse HTML (320). In some embodiments, client device 102 may transmit the redirected URL to API gateway 206, which may, in turn, retrieve the time-lapse single page application for transmission to client device 102. In some embodiments, client device 102 may interface directly with content delivery network 106 to retrieve the time-lapse single page application.

As shown, running in the background, automated bot 210 may continuously transmit requests (322), via API gateway 206, to shell service 208 for the single page application managed by shell service 208. Automated bot 210 may capture a time-lapse HTML of the single page application and store the time-lapse HTML of the single page application in content delivery network 106 (324).

Figure 4:
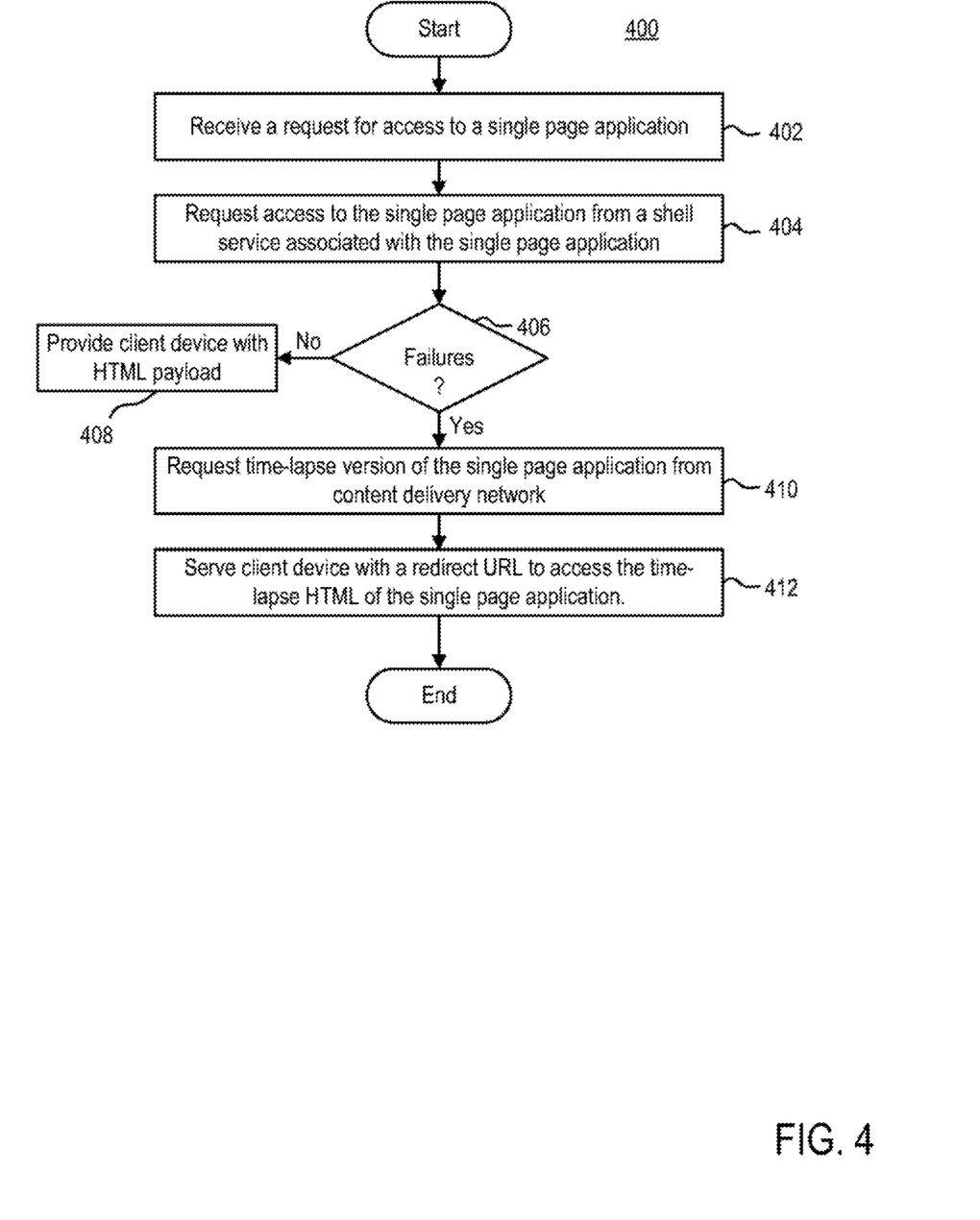
FIG. 4 is a flow diagram illustrating a method of managing access to a single page application, according to various embodiments of the present disclosure.

FIG. 4 is a flow diagram illustrating a method 400 of managing a single page application, according to one or more embodiments. Method 400 may begin at step 402.

At step 402, back-end computing system 104 receives a request, from client device 102, for access to a single page application. In some embodiments, the request may originate from application 110 executing on client device 102. API gateway 206 may intercept the request from client device 102.

At step 404, back-end computing system 104 may request access to the single page application from shell service 208 associated with the single page application. For example, API gateway 206 may transmit a GET request to shell service 208 for an HTML corresponding to the single page application.

At step 406, back-end computing system 104 determines whether the shell service has experienced any failures. In some embodiments, API gateway 206 may continuously monitor shell service 208 and may detect for any signs of failure from shell service 208 by checking for e.g., 50× and/or 429 errors. In some embodiments, API gateway 206 may detect for signs of failure from shell service 208 by setting a threshold time limit for shell service 208 to respond to the request. For example, API gateway 206 may set a throttling threshold of X-seconds. If shell service 208 does not respond within X-seconds, then API gateway 206 may determine that a failure is present.

If, at step 406, back-end computing system 104 determines that a failure is not present, then method 400 may proceed to step 408. At step 408, back-end computing system 104 may provide client device 102 with an HTML payload for accessing the single page application.

If, however, at step 406, back-end computing system 104 determines that a failure is present, then method 400 proceeds to step 410. At step 410, back-end computing system 104 requests a time-lapsed version of the single page application from content delivery network 106. The time-lapse HTML of the single page application may be representative of a skeleton version of the single page application. In some embodiments, the time-lapse HTML may include all necessary scripts for loading the application at runtime, creating the application layout, and bootstrapping all widgets needed for navigation through the single page application.

At step 412, back-end computing system 104 serves client device 102 with a redirect URL so that client device 102 can access the time-lapse HTML of the single page application hosted on content delivery network 106. In this manner, back-end computing system 104 may ensure availability of the single page application, despite shell service 208 experiencing an internal failure.

Figure 5:
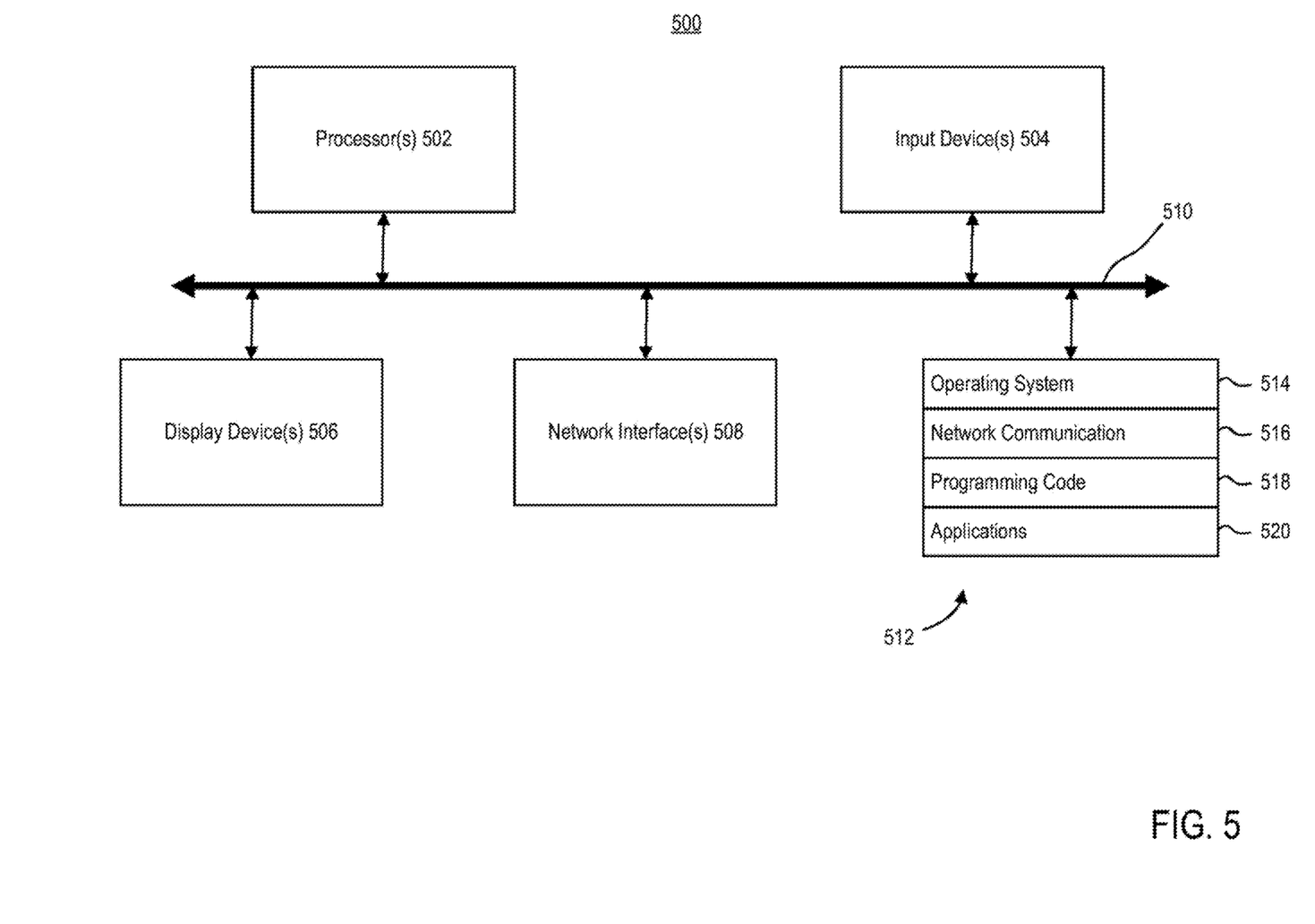
FIG. 5 is a block diagram illustrating an example computing device, according to various embodiments of the present disclosure.

FIG. 5 shows an example computing device according to an embodiment of the present disclosure. For example, computing device 500 may function as back-end computing system 104. The illustrated computing device 500 includes a single page application server that executes the processing operations described above or a portion or combination thereof in some embodiments. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include one or more processors 502, one or more input devices 504, one or more display devices 506, one or more network interfaces 508, and one or more computer-readable mediums 512. Each of these components may be coupled by bus 510, and in some embodiments, these components may be distributed among multiple physical locations and coupled by a network.

Display device(s) 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device(s) 504 may be any known input device technology, including but not limited to a keyboard (including a virtual keyboard), mouse, track ball, camera, and touch-sensitive pad or display. Bus 510 may be any known internal or external bus technology, including but not limited to ISA, EISA, PCI, PCI Express, USB, Serial ATA or FireWire. Computer-readable medium 512 may be any non-transitory medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 may include various instructions for implementing an operating system 514 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 504; sending output to display device(s) 506; keeping track of files and directories on computer-readable medium 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Programming code 518 may include instructions that enable computing device 500 to generate time-lapse HTML of a single page application and account for possible failures in a shell service for serving the single page application to end users. In this manner, programming code 518 may enable computing device 500 to ensure consistent availability of the single page application, even when the corresponding shell service is experiencing a failure. Application(s) 520 may be an application that uses or implements the processes described herein and/or other processes. The processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a computing system comprising:
    intercepting, by a gateway of the computing system, a first request from a client device for a single page application server associated with the computing system before the first request reaches a shell service associated with a single page application;
    sending, by the gateway, a second request for the single page application to the shell service;
    determining, by the gateway, that the shell service is experiencing a failure;
    responsive to determining that the shell service is experiencing the failure, retrieving, from a content delivery network, a uniform resource locator (URL) associated with a time-lapse hypertext markup language (HTML) of the single page application; and
    redirecting, based on the URL, the client device to the time-lapse HTML of the single page application.

2. The method of claim 1, further comprising:
    periodically calling, by an automated bot of the gateway, the shell service for the single page application;
    capturing, by the automated bot, dynamically generated time-lapse single page applications corresponding to the single page application; and
    storing, by the automated bot, the dynamically generated time-lapse single page applications on the content delivery network.

3. The method of claim 2, wherein retrieving, from the content delivery network, the URL associated with the time-lapse HTML of the single page application comprises:
    receiving the URL Associated with a dynamically generated time-lapse single page application that is user agnostic.

4. The method of claim 1, wherein determining, by the gateway, that the shell service is experiencing the failure comprises:
    analyzing a response from the shell service; and
    determining that an error is present.

5. The method of claim 1, wherein determining, by the gateway, that the shell service is experiencing the failure comprises:
    determining that the shell service failed to respond to the single page application request within a threshold time period for response.

6. The method of claim 1, further comprising:
    continually monitoring, by the gateway, the shell service;
    determining that the shell service has been restored; and
    based on the shell service being restored, serving, to the client device, live traffic from the shell service.

7. The method of claim 1, further comprising:
    fetching user specific context data from the client device; and
    integrating the user specific context data with the time-lapse HTML of the single page application.

8. The method of claim 1, further comprising:
    bootstrapping a plurality of widgets to the time-lapse HTML of the single page application to navigate through the time-lapse HTML of the single page application.

9. The method of claim 1, further comprising:
    intercepting, by the gateway, a second request from the client device for access to a second single page application associated with the computing system before the request reaches a second shell service associated with the second single page application.

10. The method of claim 9, further comprising:
determining, by the gateway, that the second shell service is not experiencing a failure; and
based on the determining, providing, by the gateway, the client device with a hypertext markup language (HTML) file associated with the second shell service.

11. A system comprising:
a processor; and
a memory having one or more instructions stored thereon, which, when executed by the processor, causes the system to perform operations comprising:
intercepting, by a gateway of the system, a first request from a client device to a single page application server associated with the system before the first request reaches a shell service associated with the single page application;
sending, by the gateway, a second request for the single page application to the shell service;
determining, by the gateway, that the shell service is experiencing a failure;
responsive to determining that the shell service is experiencing the failure, retrieving, from a content delivery network, a uniform resource locator (URL) associated with a time-lapse hypertext markup language (HTML) of the single page application; and
redirecting, based on the URL, the client device to the time-lapse HTML of the single page application.

12. The system of claim 11, wherein the operations further comprise:
periodically calling, by an automated bot of the gateway, the shell service for the single page application;
capturing, by the automated bot, dynamically generated time-lapse single page applications corresponding to the single page application; and
storing, by the automated bot, the dynamically generated time-lapse single page applications on the content delivery network.

13. The system of claim 12, wherein retrieving, from the content delivery network, the URL associated with the time-lapse HTML of the single page application comprises:
receiving the URL Associated with a dynamically generated time-lapse single page application that is user agnostic.

14. The system of claim 11, wherein determining, by the gateway, that the shell service is experiencing the failure comprises:
analyzing a response from the shell service; and
determining that an error is present.

15. The system of claim 11, wherein determining, by the gateway, that the shell service is experiencing the failure comprises:
determining that the shell service failed to respond to the single page application request within a threshold time period for response.

16. The system of claim 11, wherein the operations further comprise:
continually monitoring, by the gateway, the shell service;
determining that the shell service has been restored; and
based on the shell service being restored, serving, to the client device, live traffic from the shell service.

17. The system of claim 11, wherein the operations further comprise:
fetching user specific context data from the client device; and
integrating the user specific context data with the time-lapse HTML of the single page application.

18. The system of claim 11, wherein the operations further comprise:
bootstrapping a plurality of widgets to the time-lapse HTML of the single page application to navigate through the time-lapse HTML of the single page application.

19. The system of claim 11, wherein the operations further comprise:
intercepting, by the gateway, a second request from the client device for access to a second single page application associated with the system before the request reaches a second shell service associated with the second single page application.

20. The system of claim 19, wherein the operations further comprise:
determining, by the gateway, that the second shell service is not experiencing a failure; and
based on the determining, providing, by the gateway, the client device with a hypertext markup language (HTML) file associated with the second shell service.

* * * * *